Patented Feb. 2, 1937

2,069,560

UNITED STATES PATENT OFFICE 2,069,560

TERTIARY ALKYL-CYCLOHEXYL PHENOLS AND PROCESS OF PREPARING SAME

Henry S. Rothrock, Wilmington, Del., assignor to E. I. du Pont de Nemours & Company, Wilmington, Del., a corporation of Delaware No Drawing. Application February 6, 1935, Serial No. 5,299

4 Claims. (Cl. 260—154)

This invention relates to new compounds, and more particularly to new phenolic compounds obtained by condensing certain cyclohexanones and phenols.

This invention has as an object the preparation of new condensation products of tertiary alkyl cyclohexanones and certain phenols. Other objects will appear hereinafter.

The new compounds which form the object of my invention are produced by condensing tertiary alkyl substituted cyclohexanones with phenols having the para position to phenolic hydroxyl unsubstituted. The phenol should preferably be a mononuclear monohydric phenol, and the tertiary alkyl cyclohexanone should contain the tertiary alkyl substituent in the 3, 4, or 5 position on the cyclohexane ring.

In carrying out my invention I prefer to react the phenol and the tertiary alkyl cyclohexanone in the presence of strong mineral acid as a catalyst, and purifying the resulting condensation product by crystallization from an aromatic hydrocarbon solvent or from a high boiling gasoline. The procedural steps described herein, however, are capable of considerable variation without departing from the scope or spirit of the invention.

A suitable apparatus for carrying out the reaction consists of a vessel fitted with a thermometer, condenser, and a stirrer designed to sweep the sides and bottom of the vessel.

The following examples are illustrative of methods for practicing my invention:

Example I

A mixture of 94 parts of phenol, 84 parts of 4-tertiary-amyl-cyclohexanone, and 408 parts of concentrated hydrochloric acid (sp. gr. 1.19) is placed in a suitable vessel and stirred together at 30° C. for 30 hours. At the end of this time the pasty mass is washed three times with cold water, once with hot water, then steamed to remove unreacted ingredients. The product is then taken up with a small amount of toluene, and precipitated therefrom with petroleum ether. The precipitate is filtered, washed with petroleum ether, and finally purified by repeated crystallizations from toluene and from a mixture of equal parts of toluene and high boiling gasoline. The product obtained is a white crystalline solid melting at 146.5 to 147° C. Analysis of the crystals obtained shows them to contain 81.3 per cent carbon and 9.2 per cent hydrogen, whereas the theoretical proportions of carbon and hydrogen in the formula for 1,1-bis(4-hydroxyphenyl)-4-tertiary-amyl-cyclohexane ($C_{23}H_{30}O_2$) is 81.6 per cent carbon and 8.9 per cent hydrogen. The theoretical acetyl number of 1,1-bis(4-hydroxyphenyl)-4-tertiary-amyl-cyclohexane is 265.4, whereas the experimentally determined acetyl number of the product of the example is 260.8. Therefore, since the compound forms a diacetyl derivative it is evident that the two oxygens occur in esterifiable hydroxyl groups. The reaction involved in the preparation of the 1,1-bis(4-hydroxyphenyl)-4-tertiary-amyl-cyclohexane is as follows:

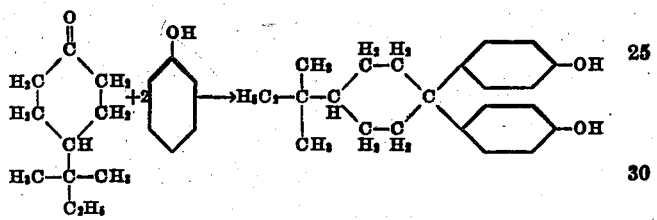

The following example illustrates the use of dry hydrogen chloride as a catalyst in the preparation of 1,1-bis(4-hydroxyphenyl)-4-tertiary-amyl-cyclohexane.

Example II

A mixture of 40 grams of 4-teritary-amyl-cyclohexanone and 45 grams of phenol is saturated with hydrogen chloride gas, and allowed to stand at room temperature for eight days. The resulting oily mass is washed with water, heated up to 150° C., and then allowed to cool to room temperature. The solid mass that formed is dissolved in hot toluene, cooled, and the resulting crystals filtered. The crystals are then dissolved in hot mineral spirits and the solution allowed to cool to room temperature, whereupon crystallization occurs. The crystals are filtered off, washed with petroleum ether, and dried at room temperature. The product obtained is a white crystalline solid melting at 146 to 147° C.

As in reactions of similar nature, the proportions of reactants, times, and temperatures of reaction, as well as the kind and amount of catalyst, are factors which will vary to some extent with the nature of the reactants.

The compounds of this invention have the following skeleton formula

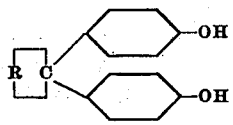

where R is the residue of a cyclohexanone ring carrying a tertiary alkyl substituent which is preferably in the para or meta positions. The benzene rings may carry alkyl substituents.

The reactants are preferably employed in substantially chemically equivalent proportions, i. e., one mol. of the ketone to two mols of the phenol. However, quantities outside this range are not precluded, and, sometimes, in the case of difficultly reacting phenols, the phenol may even be advantageously employed in excess. The ketone should occasionally be added in small successive quantities in order to minimize self-condensation.

The reaction may be conducted in the presence of inert solvents, e. g. toluene, benzene, solvent naphtha, petroleum naphtha, gasoline, chlorobenzene, glacial acetic acid, etc.

Temperatures should preferably range from 20° C. to 90° C. Below 20° C. little reaction takes place, and above 90° C. undesirable side reactions are evidenced. The most generally suitable working range is from 30–60° C.

The time of reaction should vary with the temperature, lower temperatures requiring a longer period of time for completion of the reaction. Maximum yields are obtained after periods of time ranging from a few hours up to several days. The presence, nature, and quantity of the acid catalyst also should be considered. Gaseous hydrogen chloride under the conditions of the examples does not cause the reaction to proceed as rapidly as concentrated hydrochloric acid. The speed of reaction also varies somewhat with the reactants, particularly the phenol. The homologs of phenol generally require a longer period of reaction than does phenol itself.

The catalyst is preferably hydrochloric acid, although strong mineral acids generally, e. g. hydrobromic, sulfuric, phosphoric, etc., are operable to some extent. It is often advantageous to employ mixtures of the strong mineral acid with small amounts of boric acid or with lower aliphatic acids, such as acetic. Boric acid sometimes causes the production of lighter-colored products, and when used in conjunction with sulfuric acid, boric acid decreases the tendency to formation of sulfonated compounds.

The amount of catalyst should often be large, in quantities even up to 3–5 mols per mol. of phenol. Sulfuric acid, for example, seems to be used best in quantities of 4.0–4.5 mols per mol. of phenol. The concentration of the catalyst should depend upon the nature of the acid. Anhydrous hydrogen chloride or concentrated hydrochloric acid both give excellent results whereas dilute hydrochloric is much less satisfactory. The concentration of sulfuric acid should be kept below 70–80 per cent as otherwise extensive sulfonation of the phenol takes place.

The tertiary alkyl substituted cyclohexanone mentioned in the examples may be replaced by equivalent amounts of other compounds of this kind such as 4-tertiary-butyl-cyclohexanone or 4-tertiary-heptyl-cyclohexanone. When the last mentioned cyclohexanones are used products identified as 1,1-bis(4-hydroxyphenyl)-4-tertiary-butyl-cyclohexane and 1,1-bis(4-hydroxyphenyl)-4-tertiary-heptyl-cyclohexane, respectively, are obtained. Similarly if 3-tertiary-amyl-cyclohexanone is reacted with phenol, the compound 1,1-bis(4-hydroxyphenyl)-3-tertiary-amyl-cyclohexane is obtained. I use cyclohexanones containing the alkyl substituent group in the 3, 4, or 5 positions because the corresponding 2-tertiary-alkyl-cyclohexanones, such as 2-tertiary-amyl-cyclohexanone, are difficult to condense with the phenol.

Mono-alkyl substituted mononuclear monohydric phenols may sometimes be used to advantage in the practice of the present invention. Thus, if equivalent amounts of either ortho- or meta-cresols are used in place of the phenol of the examples, 1,1-bis(4-hydroxy-3-methylphenyl)-4-tertiary-amyl-cyclohexane and 1,1-bis(4-hydroxy-2-methylphenyl)-4-tertiary-amyl-cyclohexane, respectively, are obtained. Other phenols of this kind that may be mentioned are ortho and meta-propyl phenols, ortho and meta-amyl phenols, etc. The less preferred type of phenols are alpha and beta-naphthols, the xylenols, ortho-phenyl phenol, and artetrahydro-beta-naphthol.

The compounds of the kind disclosed herein may be halogenated as indicated by the following example:

*Example III*

Chlorine is continuously passed with stirring into a suspension of 388 grams of 1,1-bis(4-hydroxyphenyl)-4-tertiary-amyl-cyclohexane in 1,000 grams of carbon tetrachloride until the mixture shows an increase in weight of 69 grams. The product is recovered by evaporation of the solvent and upon analysis shown to contain two atoms of chlorine.

A tetrachloro derivative is made by continuing the chlorination until the mixture shows an increase in weight of 138 grams. The analogous bromine compound may be similarly prepared.

Valuable wetting and dispersing agents are made by sulfonation of the products of this invention, and by nitration products useful as dye intermediates are obtained.

The compounds disclosed herein are also especially useful as ingredients for making synthetic resins. Polyether resins, for instance, may be made by reacting the mentioned compounds with aliphatic dihalides in accordance with the methods given in the application of J. A. Arvin, Serial No. 651,634, filed January 13, 1933, now Patent No. 2,060,715 dated Nov. 10, 1936. These resins are preferably made by heating above 100° C. in polymerizing proportions aliphatic polyhalides (containing the halogens attached to carbons which are in turn attached to other atoms by single bonds only) with the alkali or alkaline earth salts of my new polyphenols. The resin made by condensing β,β'-dichlorodiethyl ether with 2,2-bis(4-hydroxyphenyl)-4-tertiary-amyl-cyclohexane is superior to the resin similarly made from 1,1-bis(4-hydroxyphenyl)-4-methyl-cyclohexane in having a higher softening temperature. The resin from β,β'-dichlorodiethyl ether and 2,2-bis(4-hydroxyphenyl)-4-tertiary-amyl-cyclohexane softens at about 110° C. as compared to about 90° C. for the similar resin from 1,1-bis(4-hydroxyphenyl)-4-methylcyclohexane. This improvement in softening temperature is wholly unexpected and is of marked importance in resins of this type as it markedly enhances their field of utility.

The compounds of this invention are likewise useful for making resins with formaldehyde or with polybasic acid halides in accordance with the disclosure in the application of J. A. Arvin, Serial No. 723,795, filed May 3, 1934, now Patent No. 2,058,394 dated Oct. 27, 1936, and that of F. C. Wagner, Serial No. 664,032, filed April 1, 1933, now Patent No. 2,035,578 dated March 31, 1936.

As many apparently widely different embodiments of this invention may be made without departing from the spirit and scope thereof it is to be understood that I do not limit myself to the specific embodiments thereof except as defined in the appended claims.

I claim:

1. 1,1-bis(4-hydroxyphenyl)-4-tertiary-amyl-cyclohexane.

2. 1,1-bis(4-hydroxyphenyl)-3-tertiary-amyl-cyclohexane.

3. A compound having the general formula

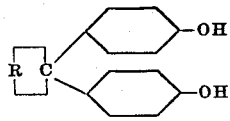

in which R is the residue of a cyclohexane ring carrying a tertiary alkyl substituent in one of the 3, 4 or 5 positions and having the remaining positions unsubstituted.

4. A process which comprises reacting, in the presence of an acid catalyst, a tertiary alkyl substituted cyclohexanone and a mononuclear monohydric phenol having the para position to the phenolic hydroxyl unoccupied, said cyclohexanone containing a tertiary alkyl substituent in one of the 3, 4 or 5 positions and having the remaining positions unsubstituted.

HENRY S. ROTHROCK.